United States Patent

Dega

[15] 3,647,337
[45] Mar. 7, 1972

[54] PRECISION MOLDING APPARATUS
[72] Inventor: Robert L. Dega, Mount Clemens, Mich.
[73] Assignee: General Motors Corporation, Detroit, Mich.
[22] Filed: June 17, 1969
[21] Appl. No.: 834,105

[52] U.S. Cl. ..........................425/242, 164/113, 249/121, 425/346
[51] Int. Cl. .........................................................B29f 1/00
[58] Field of Search ....................18/42 D, 42 I, 42 M, 34 M, 18/30 WC, 45 M, 30 LA, 30 LM, DIG. 62, 16.5; 164/113, 320, 120, 303; 249/121; 220/42 B, 24 A

[56] References Cited

UNITED STATES PATENTS

| 2,454,847 | 11/1948 | Slack | 18/42 M X |
|---|---|---|---|
| 2,691,799 | 10/1954 | Moeller | 18/30 LA |
| 3,192,569 | 7/1965 | Knabel | 18/42 D |
| 3,375,554 | 4/1968 | Blumer | 18/42 D |
| 3,415,916 | 12/1968 | Valyi | 18/42 D X |
| 941,729 | 11/1909 | Ross | 220/42 B |
| 981,384 | 1/1911 | Conover | 220/42 B |
| 1,450,422 | 4/1923 | Leighton | 220/42 B UX |
| 3,111,710 | 1/1963 | Plymale | 18/DIG. 62 |

Primary Examiner—J. Spencer Overholser
Assistant Examiner—Michael O. Sutton
Attorney—Peter P. Kozak and Sidney Carter

[57] ABSTRACT

An apparatus for injection molding dimensionally precise tubular elastomeric articles. The apparatus includes male and female mold members longitudinally movable relative to each other and adapted to form a tubular cavity therebetween, longitudinally and transversely disposed precision alignment surfaces, and means whereby an annular injection orifice is provided at one end of the cavity while the other end is provided with an annular vent opening and evacuation means. In the molding process, elastomeric material is injected into the cavity through the orifice until the mold cavity is filled. Thereafter, pressure is applied to the mold whereby the orifice and the annular vent opening are restricted and the material is subjected to a uniform pressure at all points within the mold cavity to produce a dimensionally precise elastomeric product.

5 Claims, 6 Drawing Figures

INVENTOR.
Robert L. Dega
BY
Peter P. Kozak
ATTORNEY

INVENTOR.
Robert L. Dega
BY Peter P. Kozak
ATTORNEY

PRECISION MOLDING APPARATUS

This invention relates to precision injection molding and, more particularly, to apparatus for molding ultraprecision elastomeric articles having thin membrane sections.

Commercial use of diaphragms and membranes requires precision tolerances on the order of ±0.002 to ±0.005 inch from a mean. In certain applications where the membrane is flexed at a high rate of speed under pressurized conditions, it is necessary to maintain tolerances within ±0.001 inch from the mean in order to obtain predictable life and quality. In addition, it is imperative that a thin molded membrane have an extremely uniform density from one end to the other and that it be free from foreign matter such as mold release agents, blemishes caused by air entrapment, and stress lines produced during molding.

In conventional procedures for injection molding tubular articles, the mold members are aligned by means of guide pins or extension pilots in such a way that the mold members are finally positioned before the injection stroke. The mold material is then injected into the mold cavity through a sprue and usually in an atmospheric environment, allowed to set, and then removed from the cavity. The principle disadvantage of this molding procedure is that guide pins or extension pilots cannot produce the degree of precision required to mold thin membrane sections for commercial use. Moreover, the molding pressure would obviously be diminished in the reaches of the mold cavity remote from the sprue and, in some instances, the mold would not be completely or uniformly filled, thereby producing an article having high localized nonuniformity along its length. Articles molded by the conventional procedure also entrap small amounts of air even though venting means are sometimes employed. The quality of the molded article is further reduced by the inclusion of mold release agents and the presence of stress lines.

It is a principle object of this invention to provide a precision molding apparatus whereby ultraprecision elastomeric products having thin membrane sections are made and whereby the disadvantages of the prior art procedures are eliminated.

This object and others are accomplished by providing a precision injection molding apparatus generally of the male-female type wherein the mold members have both longitudinal and transverse precision alignment surfaces, concentric with the longitudinal axis of the apparatus which mate in a cavity fill position and further in a closed position to define a mold cavity having extremely accurate dimensions, an annular sleeve surrounding the female mold member so designed to guide the male member into position and to allow the mold to be evacuated, and a spacing arrangement which limits the longitudinal movement of the male member in the cavity fill position. The process includes the steps of inserting the male member in the female member, the male member being guided by the annular sleeve and the mating longitudinal precision alignment surfaces of the members, evacuating the mold cavity, inserting a measured charge of moldable elastomeric material into a bore centrally disposed within the male member, injecting or extruding the moldable material through an annular orifice into the mold cavity, removing the spacing arrangement when the plunger has reached a given pressure which indicates that the mold cavity has been filled, subjecting the mold members to an increased pressure whereby the mold material is subjected to a uniform pressure at all points within the mold cavity, allowing the elastomeric material to set, and then subjecting the mold cavity to a slightly increased pressure through the vacuum system to remove the final article.

Other objects and advantages will be apparent from the following detailed description of the invention, reference being had to the accompanying drawings in which.

Figure 1:
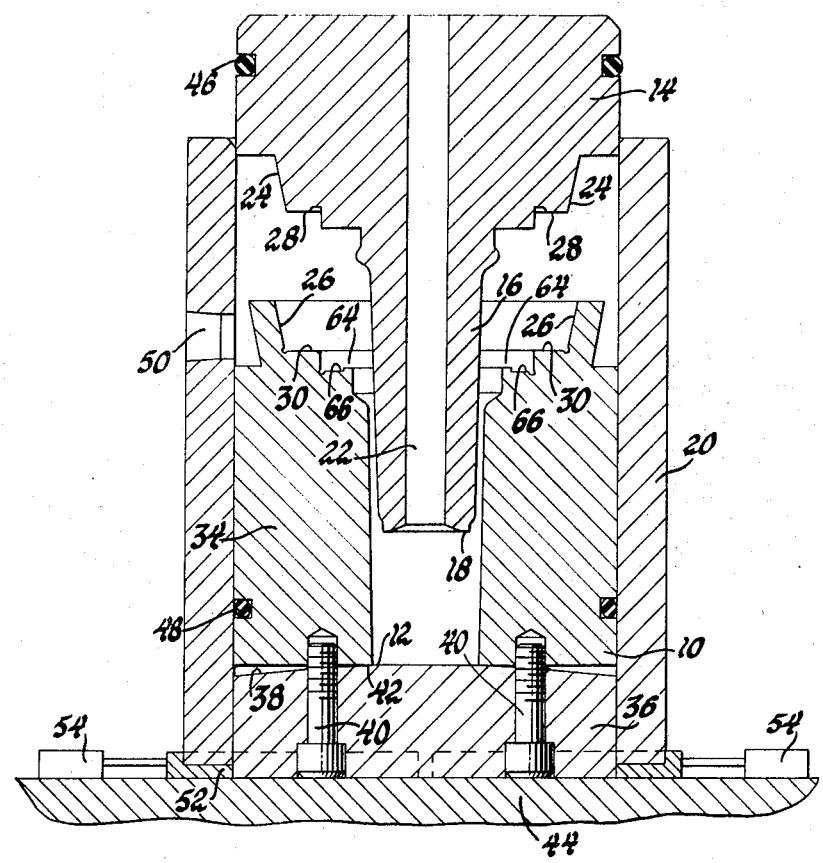
FIG. 1 is a fragmentary cross-sectional view of the molding apparatus embodying this invention showing the mold members in an open position.
Figure 2:
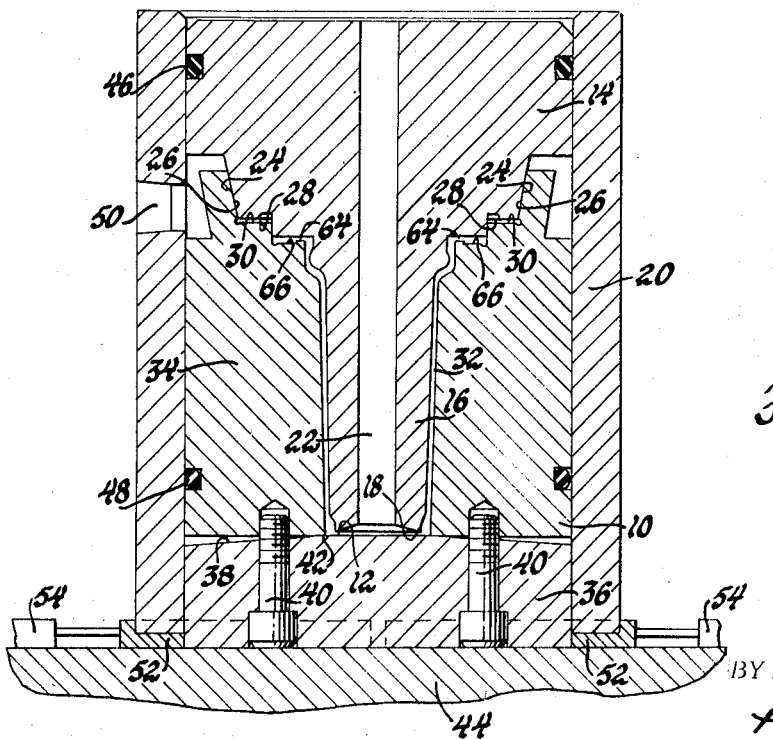
FIG. 2 is a fragmentary cross-sectional view of the molding apparatus showing the mold members when assembled.

Referring now to the drawings, particularly to FIG. 1, and FIG. 2, it will be observed that the apparatus consists basically of a female mold member 10 having an annular seat portion 12, a male mold member 14 having an elongated projection 16 terminating an annular end 18, and an annular retaining sleeve 20. Centrally of the male member 14 is a bore 22. Since precision alignment is of utmost importance the male member 14 and the female member 10 are provided with precision mating frustoconical mutual engagement surfaces 24, 26 respectively, which are machined accurately concentric to the longitudinal axis of the apparatus through the bore 22. The mold members are also provided with transverse mating surfaces 28, 30 which ensure that the male member 14 is accurately seated within the female member 10 to provide an accurately defined mold cavity 32 therebetween. When the members are first engaged it should be noted that the frustoconical surfaces 24, 26 serve to accurately guide the members to an assembled position wherein the horizontal surfaces 28, 30 are slightly parted and correspondingly the annular end of the member 14 is slightly displaced from the seat 12 of the female member 10 as will be fully explained later. Further in a closed position the frustoconical surfaces 24, 26 and the horizontal surfaces 28, 30 tightly mate to ensure accurate seating and a proper spatial relationship between the mold members.

The female member 10 is comprised of a main mold portion 34 and a cap 36 having a slightly conical taper 38 facing the main mold portion 34 so that when suitable bolts 40 are torqued a perfect pinch-off will occur at the bottom forming sharp edge 42 of the main mold portion 34. Alternatively, the main mold portion may be provided with a slight conical taper facing a flat-surfaced cap so that when torqued to the cap, a pinch-off will occur identical to that in the preferred embodiment. The cap 36 is in turn mounted to a stationary platen 44 by suitable bolts (not shown). The mold members 14, 34 are provided with O-ring seals 46, 48 respectively which prevent entry of dirt into the system and permit the mold cavity to be evacuated through an opening 50. The height of the annular retaining sleeve 20 is about 0.020 inch less than that of the mold assembly in the closed position. The apparatus also includes a split spacer ring 52 of about 0.040 inch thickness insertable between the platen 44 and the annular sleeve 20 by suitable hydraulic means 54. When the apparatus is in its cavity fill position the annular retaining sleeve 20 rests on the split spacer ring 52 so that the annular retaining sleeve 20 protrudes above the mold assembly a distance slightly less than 0.020 inch.

In the operation of the apparatus, the main mold portion 34 of the female member 10 is mounted on the cap 36 which is in turn mounted on the stationary platen 44. When necessary the stationary platen 44 is heated to the curing temperature of the elastomer being molded, for example approximately 350° F. when molding a fluoroelastomer, whereby the mold members are maintained at that temperature throughout the molding process. In the preferred embodiment, the split spacer ring 52 is inserted between the stationary platen 44 and the annular retaining sleeve 20. The male member 14 is then placed into engagement with the female member 10 so as to define a mold cavity 32, as shown in FIG. 2. The annular retaining sleeve 20 and the mating frustoconical surfaces 24, 26 serve to accurately guide and seat the male member in the female member. A measured charge of moldable elastomeric material 56 is inserted into the bore 22 and then a plunger 58 operable within the bore 22 is inserted. The mold assembly is then evacuated through the opening 50. It will be observed in FIG. 2 that the annular retaining sleeve 20 protrudes above the top surface of the male mold member 14, a distance of about 0.020 inch which is about one-half the thickness of the split spacer ring 52.

Figure 3:
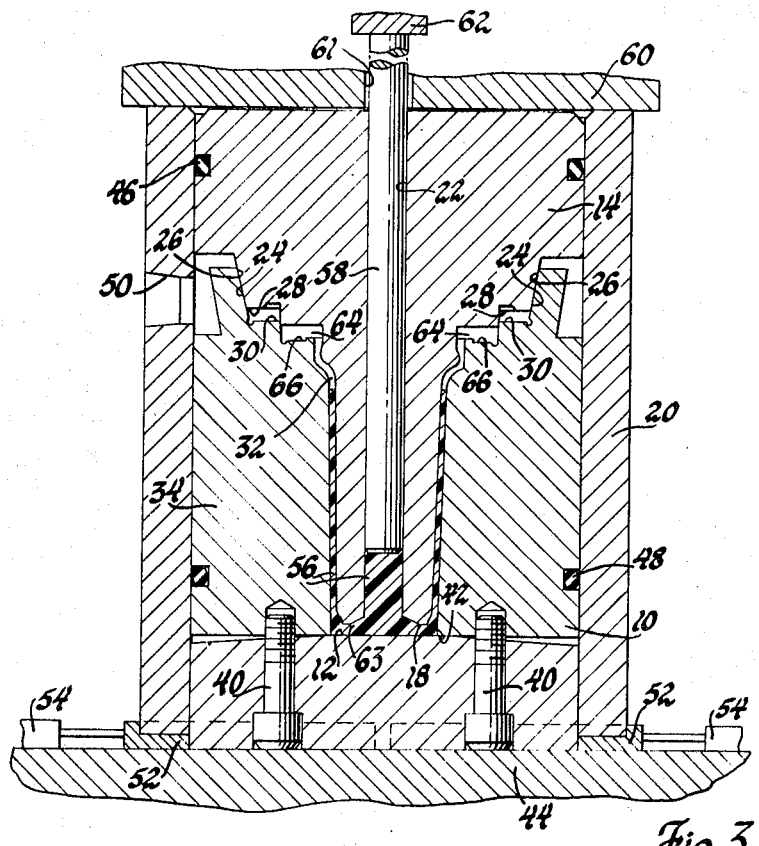
FIG. 3 is a fragmentary cross-sectional view of the molding apparatus in the cavity fill stage of the process.

In the mold cavity fill position as shown in FIG. 3, a suitable hydraulic press 60 having a hole 61 through which the plunger 58 passes, contacts the top surface of the sleeve 20 and a second hydraulic press 62 contacts the plunger 58. When pressure of about 1,000 to 4,000 p.s.i. depending on the material being molded is applied on the plunger 58 the elastomeric material is extruded through an annular orifice 63 formed between the seat portion 12 and the annular end 18 of the male member 14 by the pressure of the elastomeric material 56 against the movable male member 14. The flow of material is outward in a 360° pattern and then upward along the walls of the cavity through an annular opening 64 into a flash pocket 66 where any excess of material is deposited. By depositing any excess material in the flash pocket 66 it is ensured that a constant pressure will be maintained in the mold cavity. Pressure on the plunger is maintained to a point which will allow the mold halves to separate approximately 0.020 inch at which point the top surface of the male member 14 is flush against the press 60 which is loaded to resist further upward movement of the male member 14 whereby the thickness of the orifice 63 is limited to about 0.020 inch. In an alternative embodiment the transverse alignment surfaces 28, 30 are held within close proximity of each other, for example 0.020 inch, in the assembled position thereby defining the corresponding orifice 63 and annular opening 64 dimensions which are held constant throughout the cavity fill step.

Figure 4:
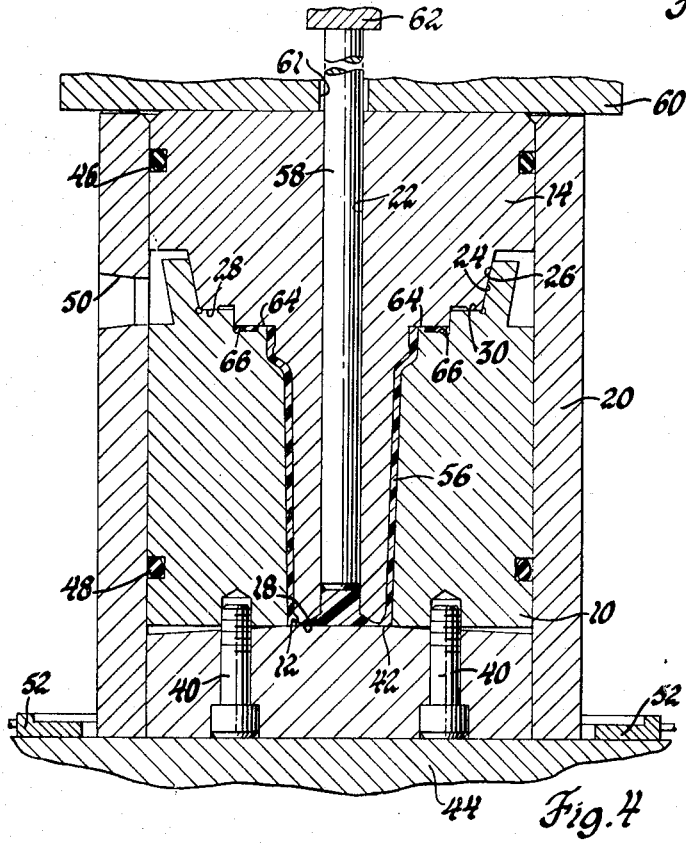
FIG. 4 is a fragmentary cross-sectional view similar to that of FIG. 2 but in a fully closed position following the cavity fill stage of the process.

Once the plunger 58 has reached a given pressure which will indicate an overloaded mold, the pressure is released slightly, the spacer ring 52 is removed and a mold closing pressure of about 10 tons is applied to the mold apparatus by the press 60 forcing the annular retaining sleeve 20 toward the stationary platen 44 until the annular end portion 18 of the male member is about 0.001 inch from the annular seat portion 12 at the base of the female member 10 and the annular opening 64 to the flash pocket 66 is restricted to about 0.001 inch in thickness, as shown in FIG. 4. Pressure during this cycle is maintained on the plunger 58 and at all times there remains an excess of material in the bore 22 so that pressures may be maintained on both extremities of the mold cavity 32. With the application of this final pressure all the alignment surfaces 24, 26, 28, 30 are finally tightly mated thereby defining a mold cavity of extremely accurate dimensions. By the application of a two-step pressure as embodied in this process, pressure is developed from both ends of the mold to form an article having extremely uniform physical properties from one end to the other. The elastomeric material is then allowed to set approximately 15 minutes, the vacuum is released and the mold is slightly pressurized to facilitate removal of the finished article.

As stated earlier in order to obtain elastomeric articles having thin membrane sections within tolerances of ±0.001 inch from the mean, it is necessary to accurately define the mold cavity. This is accomplished in the preferred embodiment by providing the male and female mold members with both longitudinal and transverse precision alignment surfaces.

In order to obtain and maintain the precision required all diameters are concentric within 0.0002 inch to the round, all mating and molding surfaces are grounded flat, parallel, and square with the longitudinal axis of the apparatus within 0.0002 inch to the round, and all mating and molding surfaces and sharp corners are polished so as to be free of nicks, scratches, dents or other imperfections. In operation, the frustoconical surface of the male member engages the frustoconical surface of the female member which is slightly smaller than that of the male member so that when in the assembled position without external pressure the horizontal engagement surfaces are separated approximately 0.002 to 0.005 inch. As pressure is applied to the mold following the cavity fill step, the frustoconical surface of the female member which is designed relatively thin expands to provide a mutual engagement entirely around the surface. Upon expansion the male mold member moves toward the female member until the horizontal surfaces mate in the closed position. The stress applied by the female frustoconical surface due to the mechanical expansion of the metal ensures a positive centering force on the male member and also provides for any out-of-round condition that might have developed due to thermal cycling. In this manner there will be absolute concentricity when the mold members are closed under pressure. Furthermore, the molds are made preferably of stainless steel, hardened and double-stabilized to prevent distortion due to thermal cycling.

Any suitable extrudable elastomer formulation including elastomers such as polybutadiene, polyisoprene, buatadiene-acrylonitrile copolymers, fluoroelastomers, polyurethane resins, or silicone resins, for example, can be molded in this invention. In one series of tests the following composition was molded:

|  | Parts by Weight |
|---|---|
| Fluoroelastomers | 100 |
| Magnesium oxide | 15 |
| Carbon black | 20 |
| N, N'-Dicinnamylidene 1, 6 Hexanediamine | 3 |

The material was processed by conventional mixing techniques and blended to provide maximum dispersion properties to ensure that the molded article would have uniform dimensional properties when cured.

The test used to determine the life of the membrane molded by the present process generally comprises placing the membrane on a rod reciprocally movable within a mating bore, developing and maintaining a gas pressure in the range of 750 to 850 p.s.i. between the rod and the membrane and an oil pressure of 690 to 790 p.s.i. between the membrane and the bore, maintaining a temperature on the oil side of the membrane of 85°–105° F., and with a stroke of 1.5 inch cycling the rod and membrane within the bore at a rate of 3,600 cycles per minute. The dimensions of a representative article molded by the present process and the results of the life tests are given below.

WALL THICKNESS*

| Total hours | 1 | | | | 2 | | | | 3 | | | |
|---|---|---|---|---|---|---|---|---|---|---|---|---|
|  | 0° | 90° | 180° | 270° | 0° | 90° | 180° | 270° | 0° | 90° | 180° | 270° |
| 0.0 | .0168 | .0169 | .0165 | .0166 |  |  |  |  | .0168 | .0167 | .0162 | .0164 |
| 24.0 | .0162 | .0161 | .0160 | .0161 |  |  |  |  | .0162 | .0161 | .0159 | .0160 |
| 195.9 | .0158 | .0158 | .0157 | .0157 |  |  |  |  | .0159 | .0158 | .0153 | .0156 |
| 406.3 | .0155 | .0154 | .0150 | .0152 |  |  |  |  | .0156 | .0154 | .0151 | .0154 |
| 624.6 | .0151 | .0151 | .0149 | .0150 |  |  |  |  | .0155 | .0152 | .0150 | .0151 |
| 866.3 | .0150 | .0149 | .0146 | .0148 |  |  |  |  | .0152 | .0150 | .0148 | .0150 |
| 1064.0 | .0149 | .0146 | .0142 | .0146 |  |  |  |  | .0151 | .0149 | .0146 | .0149 |
| 1718.0 | .0142 | .0141 | .0138 | .0140 | .0144 | .0143 | .0140 | .0143 | .0147 | .0146 | .0142 | .0146 |
| 2024.5 | .0139 | .0136 | .0133 | .0138 | .0141 | .0139 | .0139 | .0141 | .0142 | .0140 | .0140 | .0141 |

Figure 5:
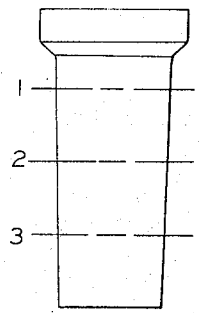
FIG. 5 is a schematic drawing of the sectioning position used to evaluate the quality of the molded article.
Figure 6:
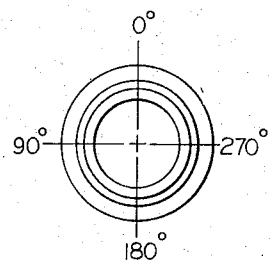
FIG. 6 is an end view of FIG. 5.

*See Figs. 5 and 6 for section positions.

| Total Hours | Maximum Variation From Mean | Maximum Thickness Variation (1%) | Length (Inch) | Elongation (%) |
| --- | --- | --- | --- | --- |
| 0.0 | 0.00035 | 2.1 | 1.040 | — |
| 24.0 | 0.00035 | 0.9 | 1.061 | 2.0 |
| 195.9 | 0.0003 | 1.9 | 1.080 | 3.9 |
| 406.3 | 0.0002 | 2.0 | 1.100 | 5.8 |
| 624.6 | 0.0003 | 2.0 | 1.120 | 7.7 |
| 866.3 | 0.0003 | 2.0 | 1.140 | 9.6 |
| 1,064.0 | 0.00045 | 3.1 | 1.150 | 10.6 |
| 1,718.0 | 0.00045 | 3.2 | 1.210 | 16.4 |
| 2,024.5 | 0.00045 | 3.3 | 1.260 | 21.1 |

From the above, it will be noted that the membrane maintained the necessary maximum wall thickness variation from the mean well within the ±0.001 inch required for commercial use. Furthermore, the membrane survived 2,024.5 hours of testing without rupturing. In comparison, membranes having variations in wall thicknesses of 0.003 to 0.005 inch had unpredictable lives ranging from 0.4 to only 47 hours. It is apparent, then, that the method and apparatus embodied in the present invention offer significant advantages in producing dimensionally precise elastomeric products having a greatly increased wear life.

Although the invention has been described in terms of a specific embodiment, it will be understood that various modifications may be made within the scope of the invention.

I claim:

1. Mold apparatus for precision molding tubular elastomeric articles from an extrudable elastomer material comprising, in combination, a male mold including an elongated male member having a longitudinal bore therethrough substantially centrally thereof terminating in an annular end portion and a plunger reciprocable within said bore, a female mold member having an elongated recess therein having a base portion including an annular seat portion therein adapted to receive said male member in spaced relation thereto to form an annular mold cavity therebetween having a first end at said base and an opposite end, each of said mold members having transverse and longitudinal precision alignment surfaces adapted to mate and to accurately space said male member from said recess to thereby accurately define said mold cavity, means for supporting said mold members sequentially and intermittently in (1) an open position (2) a cavity fill position wherein said transverse alignment surfaces are in spaced relation and said longitudinal alignment surfaces are in contact, said annular end of said male mold is held in close proximity to said seat to form an annular orifice at said first end of said cavity and an annular opening is formed at the opposite end thereof, and (3) a mold close position wherein said transverse alignment surfaces are tightly engaged and said orifice and said opening are restricted, said plunger means being operative to force said extrudable elastomer into said cavity through said orifice while the molds are in said cavity fill position and to cause said material to freely and completely fill said mold cavity, and said mold cavity surfaces being operative to exert uniform pressure on said elastomeric material in said mold close position while said material is being cured.

2. Mold apparatus for precision molding tubular elastomeric articles from an extrudable elastomer material comprising, in combination, a male mold including an elongated male member having a longitudinal bore therethrough substantially centrally thereof terminating in an annular end position and a plunger reciprocable within said bore, a female mold member having an elongated recess therein having a base portion including an annular seat portion therein adapted to receive said male member in spaced relation thereto to form an annular mold cavity therebetween having a first end at said base and an opposite end, each of said mold members having frustoconical precision alignment surfaces accurately concentric to the longitudinal axis of the apparatus and precision transverse alignment surface adapted to mate and to accurately space said male member from said recess to thereby accurately define said mold cavity, means for supporting said mold members sequentially and intermittently in (1) an open position (2) a cavity fill position wherein said transverse alignment surfaces are spaced about 0.020 inch apart and said frustoconical alignment surfaces are in contact, said annular end of said male mold is held within about 0.020 inch of said seat to form an annular orifice at said first end of said cavity and an annular opening of about 0.020 inch is formed at the opposite end thereof, and (3) a mold close position wherein said transverse alignment surfaces are tightly engaged and said orifice and said opening are restricted, said plunger means being operative to force said extrudable elastomer into said cavity through said orifice while the molds are in said cavity fill position and to cause said material to freely and completely fill said mold cavity, and said mold cavity surfaces being operative to exert uniform pressure on said elastomeric material in said mold close position while said material is being cured.

3. Mold apparatus for precision molding tubular elastomer articles from an extrudable elastomer material comprising, in combination, a movable male mold including an elongated male member having a longitudinal bore therethrough substantially centrally thereof terminating in an annular end portion and a plunger reciprocable within said bore, a female mold attached to a stationary platen having an elongated recess therein having a base portion including an annular seat portion therein adapted to receive said male member in spaced relation thereto to form an annular mold cavity therebetween having a first end at said base and an opposite end, each of said mold members having frustoconical precision alignment surfaces accurately concentric to the longitudinal axis of the apparatus and precision transverse alignment surfaces adapted to mate and to accurately space said male member from said recess to thereby accurately define said mold cavity, means for supporting said mold members sequentially, in (1) an open position, (2) a cavity fill position wherein said transverse alignment surfaces are in spaced relation and said frustoconical alignment surfaces are in contact, said annular end of said male mold is held in close proximity to said seat to form an annular orifice at said first end of said cavity and an annular opening is formed at the opposite end thereof, and (3) a mold close position wherein said transverse alignment surfaces are tightly engaged and said orifice and said opening are restricted, said means for supporting said mold members including a vertically movable annular sleeve surrounding said male and female molds, said male mold being freely movable within said sleeve, a split spacer ring insertable between said sleeve and said platen in said cavity fill position whereby said sleeve is moved upward and caused to protrude above said male member, and a press longitudinally movable above said sleeve and male mold adapted to engage said sleeve when said ring is inserted between said sleeve and said platen in said cavity fill position and to apply pressure to said male mold when said ring is removed, said plunger means being operative to force said extrudable elastomer into said cavity through said orifice when said molds are in said cavity fill position with said ring inserted between said sleeve and said press is in engagement with said sleeve to limit the upward movement of said male mold to thereby limit the maximum thickness of said orifice, and said press being operative to force said molds to said mold closed position when said mold cavity is filled and said ring is removed to exert uniform pressure on said elastomeric material in said cavity while said material is being cured.

4. Apparatus of claim 3 wherein the maximum thickness of said orifice is about 0.020 inch.

5. Apparatus of claim 3 wherein the dimensions of said female mold frustoconical surfaces are slightly smaller than the corresponding male frustoconical surfaces whereby said male member annular end portion is slightly spaced from said annular seat portion in said cavity fill position and said press is operative to force said frustoconical surfaces and said transverse surfaces into a mating relation in said mold closed position.

* * * * *